3,408,381
S - 2 - [(CYCLOALKYL - ALKYL AND CYCLO-
ALKENYL - ALKYL)AMINO]ETHYL THIO-
SULFATES AND SALTS THEREOF
Roger D. Westland, Ann Arbor, Mich., assignor to Parke
Davis & Company, Detroit, Mich., a corporation of
Michigan
No Drawing. Filed Oct. 23, 1965, Ser. No. 504,113
6 Claims. (Cl. 260—453)

ABSTRACT OF THE DISCLOSURE

S - 2 - [(cycloalkyl-, 4 - bicyclohexylyl-, decalyl-, and cycloalkenyl - alkyl)amino] ethyl thiosulfates and salts thereof, useful as antiradiation agents; and their production by (a) reacting a cycloalkyl-, 4 - bicyclohexylyl-, decalyl-, or cycloalkenyl-alkyl halide with an alkali metal salt of S - 2 - aminoethyl thiosulfate, (b) reacting a 2-[(cycloalkyl-, 4 - bicyclohexylyl-, decalyl-, or cycloalkenyl - alkyl)amino] - ethyl disulfide compound with a salt of sulfurous acid in the presence of an oxidizing agent, and (c) reacting a hydrohalide salt of an N - (cycloalkyl-, 4 - bicyclohexylyl-, decalyl-, or cycloalkenyl-alkyl)aminoethyl halide compound with aqueous sodium thiosulfate.

SUMMARY AND DETAILED DESCRIPTION

The present invention relates to new organic thiosulfate compounds and to methods for their production. More particularly, the invention relates to new aminoethyl thiosulfate compounds, having in the free acid form the formula

R—A—CH$_2$—NH—CH$_2$CH$_2$—S—SO$_3$H

I and to pharmaceutically-acceptable salts thereof; where R is a cycloalkyl radical, a mono- or di-lower alkyl-substituted cycloalkyl radical, a lower alkoxy-substituted cycloalkyl radical, a 4 - bicyclohexylyl radical, a decalyl radical, or a cycloalkenyl radical; and A represents a linear or branched alkylene radical containing from 2 to 8 carbon atoms. The cycloalkyl and cycloalkenyl radicals denoted by R in the above formula are those containing from 4 to 7 carbon atoms and the lower alkyl and lower alkoxy substituents are those containing not more than 4 carbon atoms.

In accordance with the invention aminoethyl thiosulfate compounds having the foregoing formula are produced by the reaction of an alkyl halide compound, having the formula

R—A—CH$_2$—X

II with an alkali metal salt of S - 2 - aminoethyl thiosulfate, said salt having the formula

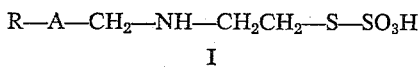

III where M represents an alkali metal, preferably sodium, X is chlorine or bromine, and R and A have the aforementioned significance. The reaction is normally carried out in a solvent. Suitable solvents for this purpose include water; lower alkanols, such as methanol, ethanol, and isopropyl alcohol; ethers, such as dioxane, tetrahydrofuran, and 1,2 - dimethoxyethane; and tertiary amides, such as N,N - dimethylformamide; as well as mixtures of these. A preferred solvent is 95% ethanol. The temperature of the reaction is not critical and may be varied over a wide range from room temperature to about 150° C. It is most convenient to carry out the reaction at the reflux temperature of the reaction mixture. The duration of the reaction is likewise not critical and will vary widely from several hours to several days, depending on the particular reactants and temperature employed. At the reflux temperature, the reaction is normally complete in about 15–20 hours. While equivalent quantities of reactants may be employed, it is preferable to use a moderate excess of the alkali metal salt of S - 2 - aminoethyl thiosulfate to insure complete reaction.

The alkyl halide compounds having Formula II above that are used as starting materials in the foregoing procedure can be prepared in a number of ways, as described in greater detail hereinafter. In general, the alkyl halide compounds are obtained from the reaction of an alkanol compound, having the formula

R—A—CH$_2$—OH

IV with a halogenating agent, such as thionyl chloride or phosphorus tribromide. The alkanol compounds of Formula IV can be prepared either by reduction of an appropriately substituted alkanoic acid or ester or by reaction of an appropriately substituted alkyl magnesium halide compound with ethylene oxide followed by hydrolysis of the reaction product mixture.

Also in accordance with the invention, aminoethyl thiosulfate compounds having Formula I and salts thereof are produced by the reaction of a disulfide compound, having the formula

[R—A—CH$_2$—NH—CH$_2$CH$_2$—S]$_2$

V or a mineral acid salt thereof, with a salt of sulfurous acid in the presence of an oxidizing agent in an unreactive solvent medium; where R and A are as defined previously. Salts of sulfurous acid that may be used in the reaction include ammonium sulfite, ammonium bisulfite, alkali metal sulfites, alkali metal bisulfites, alkaline earth metal sulfites, and alkaline earth metal bisulfites. When an alkali metal salt of sulfurous acid is employed, an alkali metal bisulfite is preferred over an alkali metal sulfite. The highly preferred sulfurous acid salt is freshly-prepared ammonium sulfite. Oxidizing agents that may be used are air, oxygen, cupric ion, iodosobenzoate ion, and tetrathionate ion. The sulfurous acid salt employed in the reaction also can function as the required oxidizing agent, in which case an additional oxidizing agent is not required. The preferred oxidizing agent, however, is air, and the reaction is most conveniently carried out by bubbling air through the reaction mixture containing the disulfite compound and salt of sulfurous acid until oxidation is complete. Solvents that may be employed in the reaction are water and lower alkanols, such as methanol, ethanol, and isopropyl alcohol, as well as mixtures of these. A preferred solvent is aqueous methanol. The temperature of the reaction is not critical and may be varied. For convenience, with the use of air as the oxidizing agent, the reaction can readily be carried out at room temperature. The duration of the reaction is likewise not critical, and may be varied from about 5 hours to 48 hours, depending on the method of oxidation employed. When air is used as the oxidizing agent as described above, the oxidation is normally complete after a period of 10–20 hours. To insure complete reaction, the chosen salt of sulfurous acid is employed in large excess, that is, approximately 10 to 15 moles or more of sulfurous acid salt is used for each mole of disulfide compound. The oxidizing agent employed is added in an amount sufficient to effect complete oxidation.

When ammonium sulfite is used in the foregoing reaction, the product is obtained in the free acid form, that is, a compound having Formula I. When an alkali metal bisulfite is employed, the product obtained is an alkali metal salt of the aminoethyl thiosulfate compound having Formula I. In the latter case, it is desirable to neutralize the excess alkali metal bisulfite with the corresponding alkali metal hydroxide prior to isolation of the alkali metal salt.

The disulfite compounds having Formula V above that are used as starting materials in the foregoing process are prepared by the oxidation, for example, by reaction with hydrogen peroxide in an alkaline medium, of the corresponding thiol compound, having the formula $$R-A-CH_2-NH-CH_2CH_2-SH$$
VI or a mineral acid salt thereof; where R and A have the same meaning as previously given. The mineral acid salts of the disulfides, which may also be used as starting materials, are prepared by reacting the disulfide with an equivalent amount of mineral acid in an unreactive solvent. The thiol compounds of Formula VI and mineral acid salts thereof can be prepared in a number of ways, as will appear in greater detail hereinafter. For example, an alkanoic acid chloride, having the formula $$R-A-\overset{O}{\underset{\|}{C}}-Cl$$
VII is reacted with 2-(benzylthio)ethylamine, and the amide product, having the formula $$R-A-\overset{O}{\underset{\|}{C}}-NH-CH_2CH_2-S-CH_2C_6H_5$$
VIII is reduced by reaction with lithium aluminum hydride and subsequent hydrolysis to give a benzylmercaptoethylamine compound, having the formula $$R-A-CH_2-NH-CH_2CH_2-S-CH_2C_6H_5$$
IX which is reacted with sodium in liquid ammonia whereby the benzyl group is removed to give the desired thiol compound of Formula VI, which can be isolated in mineral acid salt form following reaction with a mineral acid, for example, hydrochloric acid.

Further in accordance with the invention aminoethyl thiosulfate compounds having Formula I are produced by reacting a hydrohalide salt of an N-alkylaminoethyl halide compound, said salt having the formula $$R-A-CH_2-NH-CH_2CH_2-X \cdot HX$$
X with sodium thiosulfate in an aqueous solvent medium; where R, A, and X have the aforementioned significance. The preferred halogen represented by X in the above formula is bromine. The solvent medium used for this reaction may be water alone or an aqueous mixture of a lower alkanol, such as methanol, ethanol, or isopropyl alcohol. The temperature of the reaction is not critical; it is most convenient to carry out the reaction at or near the reflux temperature of the reaction mixture. The duration of the reaction is likewise not critical; at the reflux temperature it is normally complete after a period of from about 30 minutes to several hours. The completion of the reaction can be determined by acidifying an aliquot of the reaction mixture with mineral acid; failure of sulfur to precipitate indicates that the reaction is essentially complete. It is preferable to employ equivalent quantities of reactants, although a slight excess of either is not harmful. When an excess of sodium thiosulfate is used, the foregoing test for completion of the reaction cannot be used. The product of the reaction can be isolated by cooling or by concentration of the mixture.

The N-alkylaminoethyl halide hydrohalide salt compound used as a starting material in the foregoing process is prepared by reacting an alkyl halide compound having Formula II above with 2-aminoethanol, followed by halogenation, as by reaction with 48% hydrobromic acid, of the N-alkylaminoethanol product.

The compounds of the invention are useful pharmacological agents. They are antiradiation agents that are active in protecting against the effects of exposure to X-ray or gamma ray radiation. They are active upon oral or parenteral administration. Parenteral administration is preferred.

The compounds of the invention can be used either in the free acid form, having Formula I above, or in the form of a pharmaceutically-acceptable salt formed with an alkali metal hydroxide, an alkali metal carbonate, an alkali metal alkoxide, a quaternary ammonium hydroxide, or an alkaline earth metal hydroxide. In the free acid form the compounds of the invention exist as internal salts that may also be represented by the formula $$R-A-CH_2-\overset{+}{N}H_2-CH_2CH_2-S-SO_3^-$$
XI where R and A are as defined previously. Pharmaceutically acceptable salts of the aminoethyl thiosulfate compounds of the invention are prepared as described above or by reaction of the selected aminoethyl thiosulfate compound in the free acid form with a dilute solution of an equivalent amount of the selected base in an unreactive solvent, such as water or a lower alkanol. The preferred salts are the salts of an alkali metal, which are preferably prepared by reacting a selected aminoethyl thiosulfate compound in free acid form with an equivalent amount of an alkali metal alkoxide in a lower alkanol solvent.

The invention is illustrated by the following examples:

EXAMPLE 1

To a solution of 19.7 g. of sodium S-2-aminoethyl thiosulfate in 200 ml. of 95% ethanol, heated under reflux, is added dropwise over 30–45 minutes 18.8 g. of 5-cyclobutylpentyl bromide, and the resulting mixture is heated under reflux overnight. The mixture is concentrated to half-volume, 100 ml. of water is added, and the aqueous solution is neutralized with glacial acetic acid and chilled to precipitate S-2-[(5-cyclobutylpentyl)amino]ethyl thiosulfate, which is isolated, dried, and crystallized from ethanol; M.P. 218–221° C.

The potassium salt of S-2-[(5-cyclobutylpentyl)amino] ethyl thiosulfate is obtained by treating a methanolic solution of 2.0 g. of the free acid at room temperature with an equivalent amount of 10% aqueous potassium hydroxide, evaporating the resulting mixture to dryness under reduced pressure, and crystallizing the solid salt obtained from methanol.

The 5-cyclobutylpentyl bromide used as a starting material in the foregoing procedure is prepared as follows. To 6.4 g. of magnesium powder and a crystal of iodine in 20 ml. of dry tetrahydrofuran under nitrogen is added 5 ml. of a solution of 43 g. of 3-cyclobutylpropyl bromide in 100 ml. of tetrahydrofuran. After the reaction is initiated, the remainder of the 3-cyclobutylpropyl bromide solution is added and the mixture is heated under reflux for 2 hours. Upon cooling, a solution of 11.7 g. of ethylene oxide in 40 ml. of tetrahydrofuran is added while the temperature is kept below 20° C. The mixture is then heated under reflux for 2 hours, cooled, and hydrolyzed with enough dilute hydrochloric acid to dissolve the solid that forms. The ethereal layer is separated, dried, concentrated and the residue distilled under reduced pressure to give 5-cyclobutylpentanol; B.P. 110–114° C./ 20 mm. Hg. To a mixture of 22.4 g. of 5-cyclobutylpentanol and 1.0 ml. of pyridine at −10° C. is added 5.6 ml. of phosphorus tribromide, and the resulting mixture is allowed to warm to room temperature and is stirred overnight. It is then poured into water, and the aqueous mixture is extracted with ether. The ether extract is washed with saturated aqueous sodium bicarbonate and with water, dried and distilled to give 5-cyclobutylpentyl bromide; B.P. 110–113° C./19 mm. Hg.

The 3-cyclobutylpropyl bromide used in this preparation is obtained in an analogous manner to that described above starting from cyclobutylmethyl bromide.

EXAMPLE 2

Utilizing the procedure described in Example 1 above, the following S-2-[(cyclopentylalkyl)amino]ethyl thiosulfate compounds are prepared from the designated cyclopentylalkyl halide and the sodium salt of S-2-aminoethyl thiosulfate.

(a) From the reaction of 40 g. of 4-cyclopentylbutyl chloride and 44.8 g. of sodium S-2-aminoethyl thiosulfate there is obtained S-2-[(4-cyclopentylbutyl)amino]ethyl thiosulfate; M.P. 200–203° C., following crystallization from ethanol.

(b) From the reaction of 30 g. of 5-cyclopentylpentyl chloride, 43 g. of sodium S-2-aminoethyl thiosulfate, and 1.3 g. of potassium iodide there is obtained S-2-[(5-cyclopentylpentyl)amino]ethyl thiosulfate; M.P. 209–212° C., following crystallization from 95% ethanol.

(c) From the reaction of 24 g. of 6-cyclopentylhexyl chloride and 25 g. of sodium S-2-aminoethyl thiosulfate, there is obtained S-2-[(6-cyclopentylhexyl)amino]ethyl thiosulfate; M.P. 212–216° C., following two crystallizations from ethanol.

(d) From the reaction of 30 g. of 7-cyclopentylheptyl chloride and 53.6 g. of sodium S-2-aminoethyl thiosulfate there is obtained S-2-[(7-cyclopentylheptyl)amino]ethyl thiosulfate; M.P. 216–220° C., following crystallization from ethanol.

(e) From the reaction of 28 g. of 8-cyclopentyloctyl chloride and 46.5 g. of sodium S-2-aminoethyl thiosulfate there is obtained S-2-[(8-cyclopentyloctyl)amino]ethyl thiosulfate; M.P. 213–216° C., following crystallization from ethanol.

(f) From the reaction of 30 g. of 9-cyclopentylnonyl chloride and 46.5 g. of sodium S-2-aminoethyl thiosulfate there is obtained S-2-[(9-cyclopentylnonyl)amino]ethyl thiosulfate, purified by trituration with hot acetone and crystallization from ethanol; M.P. 189–193° C.

The preparation of the cyclopentylalkyl halide compounds used as starting materials above can be illustrated by the preparation of 4-cyclopentylbutyl chloride as follows. Thionyl chloride (74.5 ml.) is added dropwise to a cold stirred mixture of 74 g. of 4-cyclopentylbutyl alcohol and 17 drops of pyridine, and the mixture is heated under reflux for 90 minutes, cooled, and poured onto ice. The organic phase is separated, washed with 0.1 N sodium hydroxide and with water, dried, and distilled to give 4-cyclopentylbutyl chloride; B.P. 100–102° C./21 mm. Hg.

The following cyclopentylalkyl halides are obtained in a similar manner:

(a) 5-cyclopentylpentyl chloride; B.P. 60–66° C./0.4 mm. Hg.

(b) 6 cyclopentylhexyl chloride; B.P. 74–80° C./1.0 mm. Hg.

(c) 7-cyclopentylheptyl chloride; B.P. 75–88° C./0.2 mm. Hg.

(d) 8-cyclopentyloctyl chloride; B.P. 90–95° C./0.4 mm. Hg.

(e) 9-cyclopentylnonyl chloride; B.P. 104–115° C./0.8 mm. Hg.

The 7-cyclopentylheptyl alcohol, B.P. 99–107° C./0.2 mm. Hg, and 9-cyclopentylnonyl alcohol, required for the preparation of the corresponding halides, are prepared starting from 5-cyclopentylpentyl chloride and 7-cyclopentylheptyl chloride, respectively, according to the procedure outlined in Example 1 above for the preparation of 5-cyclobutylpentyl bromide from 3-cyclobutylpropyl bromide. 8-cyclopentyloctyl alcohol, B.P. 92–110° C./0.4 mm. Hg, is obtained by reducing 8-cyclopentyloctanoic acid with lithium aluminum hydride. The substituted octanoic acid is derived from 7-cyclopentylheptyl chloride by reaction with magnesium and subsequent carbonation of the magnesium halide intermediate.

EXAMPLE 3

Utilizing the procedure described in Example 1 above, the following S-2[(cyclohexylalkyl)amino]ethyl thiosulfate compounds are prepared from the reaction of the sodium salt of S-2-aminoethyl thiosulfate with the designated cyclohexylalkyl halide compound.

(a) From reaction with 3-cyclohexylpropyl bromide there is obtained S-2[(3-cyclohexylpropyl)amino]ethyl thiosulfate, M.P. 227–228° C., following crystallization from hot water.

(b) From reaction with 4-cyclohexylbutyl chloride in the presence of a small amount of potassium iodide, after reaction for two days, there is obtained S-2[(4-cyclohexylbutyl)amino]ethyl thiosulfate, purified by trituration with acetone and crystallization from ethanol; M.P. 225–227° C.

(c) From reaction with 8-cyclohexyloctyl chloride there is obtained S-2[(8-cyclohexyloctyl)amino]ethyl thiosulfate; M.P. 222–225° C., following successive crystallizations from methanol and ethanol.

The sodium salt of S-2[(4-cyclohexylbutyl)amino] ethyl thiosulfate is obtained by adding 100 g. of the free acid to 33.8 ml. of 1.0 N sodium hydroxide, concentrating the solution to dryness under reduced pressure, and isolating, drying and crystallizing the solid salt obtained from tetrahydrofuran; M.P. 80–100° C., following exposure to air for several days.

The 4-cyclohexylbutyl chloride and 8-cyclohexyloctyl chloride starting materials, both used without purification, are prepared by reaction of the corresponding alcohols with thionyl chloride, as described in Example 2 above for the preparation of the cyclopentylalkyl chlorides. 8-cyclohexyloctyl alcohol is obtained from the lithium aluminum hydride reduction of 8-cyclohexyloctanoic acid.

EXAMPLE 4

Utilizing the procedure described in Example 1 above, the following S-2[(lower alkyl-cyclohexylalkyl)amino] ethyl thiosulfate compounds are prepared from the reaction of the sodium salt of S-2-aminoethyl thiosulfate with the designated lower alkyl-cyclohexylalkyl halide compound.

(a) From reaction with 4-(3-methylcyclohexyl)butyl bromide there is obtained S-2{[4-(3-methylcyclohexyl) butyl]amino}ethyl thiosulfate, M.P. 226–227.5° C., following successive crystallizations from ethyl acetate, ethanol, and acetone.

(b) From reaction with 4-(4-methylcyclohexyl)butyl chloride there is obtained S-2{[4-(4-methylcyclohexyl) butyl]amino}ethyl thiosulfate, M.P. 222–223° C., following crystallization from ethanol.

(c) From reaction with 4-(4-ethylcyclohexyl)butyl chloride there is obtained S-2{[4 - (4 - ethylcyclohexyl) butyl]amino}ethyl thiosulfate, M.P. 224–226° C., following crystallization from absolute ethanol.

The starting materials are prepared as follows:

(a) 4-(3-methylcyclohexyl)butyl bromide. Phosphorus tribromide (34 ml.) is added dropwise with stirring to 149 g. of 2-(3-methylcyclohexyl)ethanol kept at −10° C., the resulting mixture is allowed to warm to room temperature, and is stirred for 19 hours. It is then poured into ice-water, and the organic phase is isolated, washed with 10% aqueous sodium carbonate, dried, and distilled under reduced pressure to give 2-(3-methylcyclohexyl) ethyl bromide; B.P. 70–88° C./2 mm. Hg. This intermediate is converted to 4-(3-methylcyclohexyl)butanol, B.P. 73–85° C./0.5 mm. Hg, by initial reaction with magnesium followed by reaction with ethylene oxide according to the procedure described in Example 1 above for the conversion of 3-cyclobutylpropyl bromide to 5-cyclobutylpentanol. 4-(3-methylcyclohexyl)butanol (60 g.)

is then reacted with 32 g. of phosphorus tribromide in the presence of 1 ml. of pyridine to give the desired 4-(3-methylcyclohexyl)butyl bromide; B.P. 63–71° C./0.5 mm. Hg.

(b) 4-(4-methylcyclohexyl)butyl chloride. A mixture consisting of 107 g. of 4-p-tolylbutanol, 3 ml. of concentrated sulfuric acid, 7.5 g. of 10% platinum on charcoal, 4 g. of 10% rhodium on charcoal, and 650 ml. of methanol is shaken at room temperature with hydrogen at a pressure of 50 lbs./in.$^2$ for 24 hours or until no more hydrogen is absorbed. The catalyst is removed by filtration, and the filtrate is concentrated to near dryness. The residue is treated with water, the aqueous mixture is extracted with ether, and the ethereal solution is dried and evaporated to give 4-(4-methylcyclohexyl)butanol, isolated as an oil suitable for use without further purification. This product is converted, by reaction with thionyl chloride according to the procedure described in Example 2 above, to 4-(4-methylcyclohexyl)butyl chloride; B.P. 69–72° C./0.8 mm. Hg.

(c) 4-(4-ethylcyclohexyl)butyl chloride. A mixture consisting of 261 g. of β-(4-ethylbenzoyl)propionic acid, 5 g. of 10% palladium on charcoal, and 750 ml. of methanol is shaken at room temperature with hydrogen at a pressure of 50 lbs./in.$^2$ until hydrogen uptake ceases. To the mixture, now containing 4-(4-ethylphenyl)butyric acid, is added 10 g. of 10% rhodium on charcoal, and hydrogenation under the same conditions is resumed until no more hydrogen is absorbed. The catalyst is removed by filtration and the filtrate is evaporated to dryness under reduced pressure to give 4-(4-ethylcyclohexyl)butyric acid, suitable for use without further purification. This acid intermediate (161 g.) is reduced by reaction with lithium aluminum hydride (31 g.) in 2000 ml. of ether, and the 4-(4-ethylcyclohexyl)butanol product, B.P. 155–160°/20 mm. Hg, obtained after hydrolysis of the reaction mixture, is converted to the desired 4-(4-ethylcyclohexyl)butyl chloride by reaction with thionyl chloride.

EXAMPLE 5

Utilizing the procedure described in Example 1 above, from the reaction of 30.8 g. of S-2-aminoethyl thiosulfate and 40 g. of 4-(bicyclohexylyl)butyl chloride there is obtained S-2-{[4-(bicyclohexylyl)butyl]amino}ethyl thiosulfate, M.P. 223–224.5° C., following crystallization from methanol.

The starting material, 4-(bicyclohexylyl)butyl chloride, B.P. 205–209° C./19 mm. Hg, is prepared by reducing 4-(bicyclohexylyl)butyric acid with lithium aluminum hydride, and reacting the 4-(bicyclohexylyl)butanol product, B.P. 209–215° C./8 mm. Hg, with thionyl chloride according to procedures described earlier.

EXAMPLE 6

Utilizing the procedure described in Example 1 above, the following aminoethyl thiosulfate compounds are prepared from the reaction of the sodium salt of S-2-aminoethyl thiosulfate with the designated alkyl halide compound.

(a) From reaction with 4-(2,4-dimethylcyclohexyl)butyl chloride there is obtained S-2-{[4-(2,4-dimethylcyclohexyl)butyl]amino}ethyl thiosulfate; M.P. 211–213° C., following successive crystallizations from acetonitrile and ethanol.

(b) From reaction with 4-(2,5-dimethylcyclohexyl)butyl chloride there is obtained S-2-{[4-(2,5-dimethylcyclohexyl)butyl]amino}ethyl thiosulfate; M.P. 208–210° C,. following crystallization from ethanol.

The starting materials are prepared as follows.

(a) 4-(2,4-dimethylcyclohexyl)butyl chloride. 4-(2,4-dimethylphenyl)butyric acid is catalytically hydrogenated using 10% rhodium on charcoal to give an oily residue of 4-(2,4-dimethylcyclohexyl)butyric acid, which is reduced with lithium aluminum hydride, and the oily 4-(2,4-dimethylcyclohexyl)butanol product is reacted with thionyl chloride to give the desired 4-(2,4-dimethylcyclohexyl)butyl chloride, B.P. 73–78° C./0.7 mm. Hg, according to procedures described earlier.

(b) 4-(2,5-dimethylcyclohexyl)butyl chloride. 4-(2,5-dimethylphenyl)butanol is catalytically hydrogenated using 10% rhodium on charcoal to give 4-(2,5-dimethylcyohexyl)butanol as an oil that is reacted with thionyl chloride to give the desired 4-(2,5-dimethylcyclohexyl)-butyl chloride, obtained as an oil that is suitable for use without further purification.

EXAMPLE 7

Utilizing the procedure described in Example 1, from the reaction of 40 g. of 4-(2-decalyl)butyl chloride and 34.6 g. of S-2-aminoethyl thiosulfate there is obtained S-2-{[4-(2-decalyl)butyl]amino}ethyl thiosulfate; M.P. 217–220° C., following crystallization from isopropyl alcohol.

The 4-(2-decalyl)butyl chloride starting material, B.P. 177–178° C./19 mm. Hg, is prepared by reacting 4-(2-decalyl)butanol with thionyl chloride according to the procedure described earlier for similar halogenations.

EXAMPLE 8

Utilizing the procedure described in Example 1, the following S-2-[(methoxycyclohexylbutyl)amino]ethyl thiosulfate compounds are prepared from the reaction of the sodium salt of S-2-aminoethyl thiosulfate with the designated methoxycyclohexylbutyl halide compound.

(a) From reaction with 4-(2-methoxycyclohexyl)butyl bromide there is obtained S-2-{[4-(2-methoxycyclohexyl)butyl]amino}ethyl thiosulfate; M.P. 204–207° C., following successive crystallizations from ethanol and acetone.

(b) From reaction with 4-(4-methoxycyclohexyl)butyl chloride there is obtained S-2-{[4-(4-methoxycyclohexyl)butyl]amino}ethyl thiosulfate; M.P. 203–204° C., following several crystallizations from ethanol.

The starting materials are prepared as follows. 4-(2-methoxycyclohexyl)butyl bromide is obtained, utilizing procedures described earlier, by catalytically hydrogenating 4-(2-methoxyphenyl)butyric acid, reducing the 4-(2-methoxycyclohexyl)butyric acid product with lithium aluminum hydride, and reacting the 4-(2-methoxycyclohexyl)butanol obtained, B.P. 83–95° C./0.3–0.5 mm. Hg, with phosphorus tribromide to give the desired starting material, B.P. 75–85° C./0.2 mm. Hg, 4-(4-methoxycyclohexyl)butyl chloride, B.P. 130–131° C. C./15 mm. Hg, is prepared similarly by catalytically hydrogenating methyl 3-(4-methoxybenzoyl)propionate in two stages to methyl 4-(4-methoxycyclohexyl)butyrate, reducing this methyl ester intermediate with sodium borohydride, and reacting the 4-(4-methoxycyclohexyl)butanol obtained with thionyl chloride.

EXAMPLE 9

To a stirred solution of 53.6 g. of sodium S-2-aminoethyl thiosulfate in 200 ml. of 95% ethanol heated under reflux is added dropwise 56.8 g. of 2-cyclohexylbutyl bromide. The solution is stirred and heated under reflux for 44 hours, concentrated to about half-volume, treated with 100 ml. of water, and the aqueous mixture neutralized with glacial acetic acid. Upon cooling, there is obtained a precipitate of S-2-[(2-cyclohexylbutyl)-amino] ethyl thiosulfate, which is isolated, dried and crystallized from ethanol; M.P. 179°–180° C.

The sodium salt of S - 2-[(2-cyclohexylbutyl)amino]-ethyl thiosulfate is obtained by treating a methanolic solution of 2.0 g. of the free acid at room temperature with an equivalent amount of sodium methoxide, evaporating the resulting mixture to dryness under reduced pressure, and crystallizing the solid salt obtained from methanol.

EXAMPLE 10

Utilizing the general procedure described in Example 9 above, the following aminoethyl thiosulfate compounds are prepared from the reaction of the sodium salt of S-2- aminoethyl thiosulfate with the designated alkyl halide compound.

(a) From reaction with 2 - cyclohexylpropyl chloride there is obtained S - 2-[(2-cyclohexylpropyl)amino]ethyl thiosulfate; M.P. 206–211° C., following crystallization from ethanol.

(b) From reaction with 3-cyclohexyl-2-ethylpropyl bromide there is obtained S - 2-[(3-cyclohexyl-2-ethylpropyl)amino]ethyl thiosulfate; M.P. 173–174° C., following successive crystallizations from 2-butanone, acetone-ethanol, and 2-butanone.

(c) From reaction with 3-cyclohexylpentyl bromide there is obtained S-2-[(3-cyclohexylpentyl)amino]ethyl thiosulfate M.P. 168–169° C., following successive crystallizations from ethanol and acetone.

(d) From reaction with 4-cyclohexylhexyl bromide there is obtained S-2-[(4-cyclohexylhexyl)amino]ethyl from 2-butanone.

The starting materials listed below are prepared by utilizing procedures described earlier herein:

(a) 2-cyclohexylpropyl chloride, B.P. 37–40° C./0.5 mm. Hg, from 2-cyclohexylpropanol by reaction with thionyl chloride.

(b) 3-cyclohexyl-2-ethylpropyl bromide from 3-cyclohexyl-2-ethylpropanol by reaction with phosphorous tribromide.

(c) 4-cyclohexylhexyl bromide, B.P. 88–103° C./0.9–1.2 mm. Hg, from 4-cyclohexylhexanol by reaction with phosphorus tribromide. The 4-cyclohexylhexanol, B.P. 83–93° C./0.3 mm. Hg is prepared by reacting 1-bromo-2-cyclohexylbutane with magnesium and then reacting the alkyl magnesium halide intermediate with ethylene oxide and hydrolyzing the reaction mixture.

EXAMPLE 11

Utilizing the procedure described in Example 9 above, from the reaction of 43 g. of 4-cyclohexyl-2-ethylbutyl bromide and 35 g. of S-2-aminoethyl thiosulfate there is obtained S - 2-[(4 - cyclohexyl-2-ethylbutyl)amino]ethyl thiosulfate; M.P. 178–179° C., following crystallization from 2-butanone.

The starting material is prepared as follows: To a mixture consisting of 63 g. of cyclohexaneacetaldehyde, 98 g. of activated zinc and 1100 ml. of ether heated under reflux is slowly added 116 g. of ethyl 2-bromobutyrate, and the resulting mixture is heated under reflux for 18 hours. The liquid is decanted and treated with 250 ml. of 10% sulfuric acid. The organic layer is separated, washed successively with two 50-ml. portions of 5% sulfuric acid, 100 ml. of water, 25 ml. of 10% aqueous sodium carbonate, 25 ml. of 5% sulfuric acid, and two 50-ml. portions of water, dried, and distilled to give ethyl 4-cyclohexyl-2-ethyl-3-hydroxybutyrate; B.P. 108–111° C./0.5 mm. Hg. A mixture of 270 g. of ethyl 4-cyclohexyl-2-ethyl-3-hydroxybutyrate, 6.5 g. of p-toluenesulfonic acid, 20 ml. of sulfuric acid, and 260 ml. of toluene is heated under reflux under a water separator until the calculated amount of water is collected. The solution is cooled, washed with water and with aqueous sodium bicarbonate, concentrated and the residue distilled to give 4-cyclohexyl-2-ethyl-2-butenoic acid, ethyl ester; B.P. 92–108° C./0.4 mm. Hg. A mixture of 73 g. of 4-cyclohexyl-2-ethyl-2-butenoic acid ethyl ester, 1.0 g. of 2% palladium on charcoal, and 500 ml. of absolute ethanol is shaken at room temperature with hydrogen at one atmosphere pressure. The catalyst is removed by filtration, and the filtrate is evaporated to dryness to give ethyl 4-cyclohexyl-2-ethylbutyrate as an oil suitable for use without further purification. Using procedures described earlier herein this ester (73.0 g.) is reduced by means of lithium aluminum hydride (12.5 g.) and the 4-cyclohexyl-2-ethylbutanol product, B.P. 87°–93° C./0.6–0.7 mm. Hg, is reacted with phosphorus tribromide to give the desired 4-cyclohexyl-2-ethylbutyl bromide, isolated as oil that is suitable for use without further purification.

EXAMPLE 12

Utilizing the procedure described in Example 9 above, the following aminoethyl thiosulfate compounds are prepared from the reaction of the sodium salt of S-2-aminoethyl thiosulfate with the designated alkyl halide compound.

(a) From reaction with 2-cyclohexylpentyl bromide there is obtained S-2-[(2-cyclohexylpentyl)amino]ethyl thiosulfate; M.P. 198–199° C., following crystallization from ethanol.

(b) From reaction with 2-(3-methylcyclohexyl)-butyl bromide there is obtained S-2-{[(2-(-methylcyclohexyl)-butyl]amino}ethyl thiosulfate; M.P. 160–162° C., following crystallization from ethanol.

The starting materials listed below are prepared by the reactions indicated, utilizing procedures described earlier herein.

(1) 2-cyclohexylpentyl bromide. Ethyl 2-bromo-valerate is reacted with cyclohexanone in the presence of zinc, followed by acid hydrolysis of the reaction mixture, to give ethyl 2-(1-hydroxycyclohexyl)valerate, B.P. 105–110° C./0.25 mm. Hg; this ester product is dehydrated by reaction with p-toluenesulfonic acid to give ethyl 2-(1-cyclohexenyl)valerate, B.P. 92–98° C./0.4 mm. Hg; this intermediate is then catalytically hydrogenated to ethyl 2-cyclohexylvalerate, B.P. 85–87° C./0.6 mm. Hg, which is reduced by reaction with lithium aluminum hydride, and the 2-cyclohexylpentanol obtained, B.P. 85° C./0.7 mm. Hg, is reacted with phosphorus tribromide under reflux in the presence of pyridine to give the desired 2-cyclohexylpentyl bromide, B.P. 70–77° C./0.5 mm. Hg.

(2) 2 - (3-methylcyclohexyl)butyl bromide. Ethyl 2-bromobutyrate is reacted with 3-methylcyclohexanone in the presence of zinc, followed by acid hydrolysis of the reaction mixture, to give ethyl 2-(1-hydroxy-3-methylcyclohexyl)butyrate, B.P. 101–106° C./0.15–0.2 mm. Hg; this ester product is dehydrated by reaction with p-toluenesulfonic acid to give ethyl 2-(3-methylcyclohexenyl)butyrate, B.P. 84–87° C./0.5–0.6 mm. Hg; this intermediate is then catalytically hydrogenated to ethyl 2-(3-methylcyclohexyl)butyrate, which is reduced by reaction with lithium aluminum hydride, and the 2-(3-methylcyclohexyl)butanol obtained, B.P. 76–83° C./0.25–0.55 mm. Hg, is reacted with phosphorus tribromide to give the desired 2-(3-methylcyclohexyl)butyl bromide, B.P. 72–74° C./0.5–0.6 mm. Hg.

EXAMPLE 13

Utilizing the procedure described in Example 9 above, the following S-2-[(cycloheptylalkyl)amino]ethyl thiosulfate compounds are prepared from the reaction of the sodium salt of S-2-aminoethyl thiosulfate with the designated cycloheptylalkyl halide compound.

(a) From reaction with 4-cycloheptylbutyl bromide there is obtained S-2-[(4-cycloheptylbutyl)amino]ethyl thiosulfate; M.P. 212–216° C., following crystallization from ethanol.

(b) From reaction with 5-cycloheptylpentyl chloride there is obtained S-2-[(5-cycloheptylpentyl)amino]ethyl thiosulfate; M.P. 216–220° C., following crystallization from ethanol.

(c) From reaction with 6-cycloheptylhexyl chloride there is obtained S-2-[(6-cycloheptylhexyl)amino]ethyl thiosulfate.

The starting materials listed below are prepared by the reactions indicated utilizing procedures described earlier herein.

(1) 4-cycloheptylbutyl bromide. 2-cycloheptylethanol is reacted with phosphorus tribromide to give 2-cycloheptylethyl bromide, B.P. 60–85° C./0.3–0.8 mm. Hg; this intermediate product is reacted with magnesium and then with ethylene oxide followed by acid hydrolysis to give 4-cycloheptylbutanol, which is reacted with phosphorus tribromide to give the desired 4-cycloheptylbutyl bromide, B.P. 87° C./0.5 mm. Hg.

(2) 5-cycloheptylpentyl chloride. 4-cycloheptylbutyl bromide is reacted with magnesium and then with carbon dioxide, followed by acid hydrolysis, to give 5-cycloheptylpentanoic acid; this acid intermediate is reduced by reaction with lithium aluminum hydride, and the 5-cycloheptylpentanol obtained is reacted with thionyl chloride to give the desired 5-cycloheptylpentyl chloride, B.P. 66–78° C./0.1–0.2 mm. Hg.

(3) 6-cycloheptylhexyl chloride. 4-cycloheptylbutyl bromide is reacted with magnesium and then with ethylene oxide followed by acid hydrolysis to give 6-cycloheptylhexanol, which is reacted with thionyl chloride to give the desired 6-cycloheptylhexyl chloride, B.P. 64–87° C./0.2 mm. Hg.

EXAMPLE 14

Utilizing the procedure described in Example 9 above, the following S-2-(cycloalkenylalkylamino)ethyl thiosulfate compounds are prepared from the reaction of the sodium or potassium salt of S-2-aminoethyl thiosulfate with the designated cycloalkenylalkyl halide compound.

(a) From reaction with 4-(2-cyclopentenyl)butyl chloride there is obtained S-2-{[4-(2-cyclopentenyl)butyl]amino}ethyl thiosulfate; M.P. 177–184°C., following successive crystallizations from ethanol and acetone.

(b) From reaction with 3-(3-cyclohexenyl)propyl chloride there is obtained S-2-{[3-(3-cyclohexenyl)propyl]amino}ethyl thiosulfate; M.P. 186–194° C., following crystallization from ethanol.

(c) From reaction with 4-(3-cyclohexenyl)butyl chloride there is obtained S-2-{[4-(3-cyclohexenyl)butyl]amino}ethyl thiosulfate; M.P. 177–183° C., following crystallization from ethanol.

The starting materials are prepared as indicated below utilizing procedures described earlier herein.

(1) 4-(2-cyclopentenyl)butyl chloride, B.P. 80–86° C./11 mm. Hg. is obtained from the reaction of 4-(2-cyclopentenyl)butanol with thionyl chloride.

(2) 3-(3-cyclohexenyl)propyl chloride, B.P. 89–90° C./12 mm. Hg, is prepared by reacting 4-chloromethylcyclohexene with magnesium and then with ethylene oxide, followed by acid hydrolysis, to give 3-(3-cyclohexenyl)propanol, B.P. 102–112° C./12 mm. Hg, which is reacted with thionyl chloride to give the desired starting material.

(3) 4-(3-cyclohexenyl)butyl chloride, B.P. 100–110° C./12 mm. Hg, is prepared by reacting 4-chloromethylcyclohexene with magnesium and then with trimethylene oxide, followed by acid hydrolysis, to give 4-(3-cyclohexenyl)butanol, B.P. 120–130° C./12 mm. Hg, which is reacted with thionyl chloride to give the desired starting material.

EXAMPLE 15

To a solution of 25 g. of 2-[(3-cyclopentylpropyl)amino]ethyl disulfide in 500 ml. of ethanol is added an aqueous ammonium sulfite solution (freshly prepared by bubbling 32 g. of sulfur dioxide into 550 ml. of water and neutralizing the resulting solution with concentrated ammonium hydroxide), and air is passed through the resulting solution at room temperature for 20 hours. The mixture is then evaporated to near dryness under reduced pressure, and the slurry, containing solid S-2-[(3-cyclopentylpropyl)amino]ethyl thiosulfate, is treated with cold water, filtered and the solid product is crystallized from ethanol; M.P. 200–202.5° C.

The potassium salt of S-2-[(3-cyclopentylpropyl)amino]ethyl thiosulfate is prepared by treating a methanolic solution of 2.0 g. of the free acid at room temperature with an equivalent amount of 10% aqueous potassium hydroxide, evaporating the resulting mixture to dryness under reduced pressure, and crystallizing the solid salt obtained from methanol.

The 2-[(3-cyclopentylpropyl)amino]ethyl disulfide used as starting material is prepared as follows. To a solution of 53.5 g. of 2-(benzylthio)ethylamine and 32.3 g. of triethylamine in 250 ml. of methylene chloride kept at 0–10° C. is added 51.5 g. of 3-cyclopentylpropionyl chloride, and the resulting mixture is stirred at room temperature overnight. The mixture is then washed successively with water, 1 N hydrochloric acid, and saturated aqueous sodium chloride, dried and evaporated to give an oily residue of N-[2-(benzylthio)ethyl]-3-cyclopentylpropionamide. This oily product (90 g.) is carefully added to a stirred slurry of 17 g. of lithium aluminum hydride in 1000 ml. of dry ether, and the mixture is stirred and heated under reflux for two days. After decomposition with 17 ml. of water, 17 ml. of 15% aqueous sodium hydroxide, and 50 ml. of water, the mixture is filtered, and the ethereal phase separated, dried, and evaporated to give N-(3-cyclopentylpropyl)-S-benzylmercaptoethylamine, B.P. 130–135° C./0.05 mm. Hg. This amine (70 g.) is added to 1000 ml. of refluxing liquid ammonia, sodium (pellets; 12 g.) is added with vigorous stirring and the ammonia is allowed to evaporate. To the residue is added 100 g. of ice and then 100 ml. of concentrated hydrochloric acid, and the aqueous mixture is washed with ether and filtered to isolate 2-[(3-cyclopentylpropyl)amino]-ethanethiol hydrochloride; M.P. 201–203° C., following crystallization from ethanol-ether. A solution of 15 g. of 2-[(3-cyclopentylpropyl)amino]ethanethiol hydrochloride in 400 ml. of methanol is treated with 65 ml. of 1.0 N sodium hydroxide and with 100 ml. of 3% hydrogen peroxide solution, kept overnight at room temperature and then evaporated to dryness to give the desired 2-[(3-cyclopentylpropyl)amino]ethyl disulfide, isolated as an oil that is suitable for use after being washed with water.

EXAMPLE 16

To a solution of 5 g. of 2-[(4-cyclohexylbutyl)amino]ethyl disulfide dihydrochloride in 700 ml. of 60% aqueous methanol is added 200 ml. of aqueous ammonium sulfite solution (prepared as described in Example 15 above), and air is passed through the resulting solution at room temperature for 16 hours. The mixture is then evaporated to dryness under reduced pressure, the residue is extracted with boiling methanol, the hot methanolic extract is filtered, and the filtrate is evaporated to dryness. The solid S-2-[(4-cyclohexylbutyl)amino]ethyl thiosulfate obtained is washed with water, dried, and crystallized from ethanol; M.P. 220–225° C.

The 2-[(4-cyclohexylbutyl)amino]ethyl disulfide dihydrochloride used as starting material is prepared, utilizing procedures described in Example 15 above for the preparation of the disulfide starting material, by reacting 2-(benzylthio)ethylamine with 4-cyclohexylbutyryl chloride in the presence of triethylamine to give N-[2-(benzylthio)ethyl]-4-cyclohexylbutyramide, M.P. 53–55° C.; reducing this amide intermediate by reaction with lithium aluminum hydride to give N-(4-cyclohexylbutyl)-S-benzylmercaptoethylamine, B.P. 175–182° C./0.2 mm. Hg; reacting this product with sodium in liquid ammonia to remove the S-benzyl group and oxidizing the resulting thiol compound in aqueous base (pH 10) to give 2-[(4-cyclohexylbutyl)amino]ethyl disulfide, isolated as the dihydrochloride by precipitation from ether solution and crystallization from ethanol-ether; M.P. 190–197° C.

Example 17

To 20 g. of 2-[(6-cyclohexylhexyl)amino]ethanethiol hydrochloride is added 70 ml. of 4 N iodine solution, and the resulting mixture is evaporated to dryness. The oily residue, which is somewhat impure 2-[(6-cyclohexylhexyl)amino]ethyl disulfide, is oxidized according to the procedure described in Example 16 above to give S-2-[(6-cyclohexylhexyl)amino]ethyl thiosulfate; M.P. 218–222° C., following crystallization from 95% ethanol.

The starting material is prepared, utilizing procedures described in Example 15 above, by reacting 2-(benzylthio)ethylamine with 6-cyclohexanecaproyl chloride in the presence of triethylamine to give N-[2-(benzylthio)ethyl]-6-cyclohexylcaproic acid amide, M.P. 59–60° C., following crystallization from cyclohexane-hexane; reducing this amide intermediate to N-(6-cyclohexylhexyl)-2-(benzylthio)ethylamine, isolated as the hydrochloride salt, M.P. 170–175° C.; and reacting this amine salt with sodium in liquid ammonia to give 2-[(6-cyclohexylhexyl)-amino]-ethanethiol, isolated as the hydrochloride, M.P. 205–212° C., following crystallization from ethanol-ether.

EXAMPLE 18

A mixture consisting of 34.3 g. of N-(5-cyclopentylpentyl)aminoethyl bromide hydrobromide, 27.2 g. of sodium thiosulfate pentahydrate, and 100 ml. of 25% aqueous ethanol is heated on the steam bath for one hour, concentrated to about 50–75 ml. under reduced pressure, and chilled. The solid S-2-[(5-cyclopentylpentyl)amino]-ethyl thiosulfate that precipitates is isolated, washed with water and with ether, and crystallized from absolute ethanol; M.P. 209–212° C.

The following S-2-(cycloalkylalkylamino)ethyl thiosulfate compounds are prepared in a similar manner from the reaction of 27.2 g. of sodium thiosulfate pentahydrate with the specified quantity of N-(cycloalkylalkyl)aminoethyl bromide hydrobromide:

(a) From reaction with 34.3 g. of N-(4-cyclohexylbutyl)aminoethyl bromide hydrobromide there is obtained S-2 - [(4-cyclohexylbutyl)amino]ethyl thiosulfate; M.P. 220–225° C., following crystallization from absolute ethanol.

(b) From reaction with 35.7 g. of N-(4-cycloheptylbutyl)aminoethyl bromide hydrobromide there is obtained S-2-[4-(cycloheptylbutyl)amino]ethyl thiosulfate; M.P. 212–216° C.

The sodium salt of S-2-[4-(cyclohexylbutyl)-amino]-ethyl thiosulfate is prepared by treating a methanolic solution of 2.0 g. of the free acid with an equivalent amount of sodium methoxide, evaporating the resulting mixture to dryness under reduced pressure, and crystallizing the salt obtained from methanol.

The preparation of the N-(cycloalkylalkyl)-aminoethyl bromide hydrobromides used as starting materials can be illustrated by the preparation of N-(5-cyclopentylpentyl)-aminoethyl bromide hydrobromide according to the following procedure. A solution of 87 g. of 5-cyclopentylpentyl chloride in 250 ml. of 2-aminoethanol is stirred at 140° C. for 30 hours, cooled, and extracted several times with ether. The combined ether extracts are washed with water, dried, and evaporated to dryness to give N-(5-cyclopentylpentyl)aminoethanol as an oil suitable for use without further purification. A solution of 60 g. of N-(5-cyclopentylpentyl)aminoethanol in 200 ml. of 48% hydrobromic acid is distilled at atmospheric pressure until 70 ml. of distillate has been collected. The aqueous pot residue is chilled, and the N-(5-cyclopentylpentyl)aminoethyl bromide hydrobromide that precipitates is isolated, washed with acetone, and dried under reduced pressure. It is suitable for use without further purification.

What is claimed is:

1. A member of the class consisting of aminoethyl thiosulfate compounds, having in the free acid form the formula

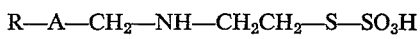

R—A—CH$_2$—NH—CH$_2$CH$_2$—S—SO$_3$H and pharmaceutically-acceptable salts thereof; where R is a member of the class consisting of cycloalkyl, mono-lower alkyl-substituted cycloalkyl, di-lower alkyl-substituted cycloalkyl, lower alkoxy-substituted cycloalkyl, 4-bicyclohexylyl, decalyl and cycloalkenyl; and A is a member of the class consisting of linear and branched alkylene radicals containing from 2 to 8 carbon atoms.

2. S-2-[(2-cyclohexylbutyl)amino]ethyl thiosulfate.
3. S-2-[(5-cyclobutylpentyl)amino]ethyl thiosulfate.
4. S-2-[(6-cyclopentylhexyl)amino]ethyl thiosulfate.
5. S-2-{[4-(3-cyclohexenyl)butyl]amino}ethyl thiosulfate.
6. S-2-[(4-cyclohexylbutyl)amino]ethyl thiosulfate.

References Cited

Wagner and Zook, Synthetic Organic Chemistry, pp. 666–667, QD 262 W24 C6.

Klayman and Gilmore, "The Synthesis of N-Substituted 2-Aminoethane Thiosulfuric Acids," The Journal of Medicinal Chemistry, vol. 7(6), pp. 823–824.

Journal of Medicinal and Pharmaceutical Chemistry, vol. 7, pp. 39–44, 1964.

Nature, vol. 183, p. 832, 1959.

"Preparation of Radioprotective Agents," United States Government Research Report, AD294344, 1962.

CHARLES B. PARKER, *Primary Examiner.*

S. T. LAWRENCE III, *Assistant Examiner.*